United States Patent Office 3,202,531
Patented Aug. 24, 1965

3,202,531
METHOD OF COATING STEEL SURFACE WITH ALKALI SILICATE AND ZINC DUST
James Patrick Dowd, Houston, Tex., assignor to Napko Corporation, Houston, Tex., a corporation of Texas
No Drawing. Filed July 27, 1962, Ser. No. 213,034
2 Claims. (Cl. 117—62)

This invention relates to improved insolubilizing agents. The insolubilizing agents are used with coatings having as major ingredients zinc powder and alkali silicates.

Mixtures of aqueous alkali silicates and zinc powder, applied to metal substrates and allowed to dry and thereafter treated with acid insolubilizing agents to render the coating water insoluble, have been proposed and used for many years.

The prior art, however, has the disadvantage that, when the dried film thickness of the zinc powder alkali silicate mixture exceeds 3 mils, it cannot be insolubilized properly with one application of the insolubilizing agent.

It is a further object of this invention to provide an insolubilizing agent that will render the film insoluble to water quicker than was possible, heretofore.

This invention contemplates the use of aliphatic oxide-mineral acid reaction products.

I have found unexpectedly that reaction products of propylene oxide and phosphoric are particularly suitable for use as insolubilizing agents.

In the process of carrying out my invention, I proceed as follows:

One mol of phosphoric acid is reacted with between 0.25 and 0.55 mol of propylene oxide. The reaction is carried out in a stainless steel tank equipped with agitator and cooling coils. Cooling coils are necessary to keep the exothermic reaction lower than the boiling point of the solvents. It has been found advantageous to carry out the reaction in nonaqueous, high boiling solvents including mixtures of alcohols, ketones and glycol ethers. These solvents by dilution of the active component help provide a more uniform reaction. They also provide a solution of suitable viscosity for brush or spray application to a surface. The insolubilizing agent thus results.

The insolubilizing agent of this invention is brushed or sprayed over a surface, the surface having been previously coated with an aqueous alkali silicate-zinc dust mixture and allowed to dry. The film thickness of the zinc dust-aqueous alkali silicate being between two and five mils dry film thickness. Between 3 and 6 hours the film will be insoluble.

Optimum phosphoric acid to propylene oxide ratio depends on the type of alkali silicate used. The proper ratio is best found by coating test panels with the proposed zinc dust and alkali silicate to five mils dry film thickness, applying the prepared insolubilizing agent in various ratios and exposing the panels to atmospheric conditions wherein the relative humidity is over 60% for at least 10 hours. To aid in eliminating the possibility of poorly cured films it is advisable afterwards to heat the panels at 100° C. for about 60 minutes, then evaluate by applying adhesive tape and ripping it off. If the panels are cracked or peeled, the curing solution should be rejected.

The prior art teaches that amine salts of strong mineral acids will cure zinc dust alkali silicate films. These suffer the disadvantage of high cost and inability to cure films over 3 mils thick with one application of insolubilizing agent. At least two or more applications of insolubilizing agents are necessary to achieve cure with materials used according to the previous art.

The prior art also teaches that certain metallic salts of strong mineral acids will insolubilize zinc dust-alkali silicate coatings. These suffer the disadvantage of being unable to cure films over 3 mils thick with one application of insolubilizing agent.

My invention will cure zinc dust-alkali silicate films up to 5 mils dry thickness with one application of insolubilizing agent, and the material costs are very moderate.

In order to specifically point out the carrying out of my invention, the following examples are given. These illustrate but do not limit the scope of my invention.

*Example I*

| Component "A": | Pounds |
|---|---|
| Ethylene glycol monoethyl ether | 1.39 |
| Propylene oxide | 1.00 |
| Methyl isoamyl ketone | 1.39 |
| Component "B": | |
| 85% phosphoric acid | 3.2 |
| Ethyl alcohol | 2.5 |

Component "B" is charged into a 10 liter stainless steel beaker equipped with an agitator, a thermometer and internal cooling coils through which water is circulated at about 0.7–1.2 gallons per minute. Component "A" is added in 10 fluid ounce increments; care being taken that the temperature of the mixture has dropped to 40° C. or below before additional component "A" is added. The insolubilizing agent results. 704 lbs. of sodium silicate (ratio of $Na_2O$ to $SiO_2$ of 1:3.22) are mixed with 75 pounds of water and 1700 lbs. of zinc powder. In place of sodium silicate, potassium or lithium silicate may be used. This is sprayed on a sandblasted steel panel to a dry film thickness of 5 mils and allowed to dry in the air.

The product of Example I is then applied by brush or spray to the surface of the coating.

A similar panel is prepared as above but instead of being treated with reaction product shown above it is treated with the normal dibutyl amine salt of phosphoric acid dissolved in isopropyl alcohol.

Both panels are left outside overnight at a relative humidity of 90%. In the morning the panel insolubilized with the phosphoric salt of normal dibutyl amine was cracked and peeled. The panel treated with the solution resulting from component "A" reacted with component "B" described above was hard and had good adhesion to the metal and was insoluble in water. There was no cracking or flaking of the coating.

Example II is included to demonstrate that a variety of solvents may be used.

*Example II*

| Component "A": | Pounds |
|---|---|
| Propylene oxide | 1.00 |
| Ethyl alcohol | 2.50 |
| Component "B": | |
| 85% phosphoric acid | 3.2 |
| Ethyl alcohol | 2.8 |

Use same method of preparation as outlined in Example I. Similar good results were observed.

*Example III*

This example is included to show that alternate ratios of propylene to phosphoric acid may be used.

| Component "A": | Pounds |
|---|---|
| Ethylene glycol monoethyl ether | 1.39 |
| Propylene oxide | .66 |
| Methyl isoamyl ketone | 1.39 |
| Component "B": | |
| 85% phosphoric acid | 3.20 |
| Ethyl alcohol | 2.50 |

Use same method of preparation outlined in Example I. Similar good results were observed.

I claim:
1. The method of curing a coating on a steel surface, said coating consisting of the dried film of an alkali silicate and zinc dust, which comprises applying to said coating, the reaction product of phosphoric acid and propylene oxide wherein the mole ratio of propylene oxide is between 0.25 and 0.55 to one mole of phosphoric acid.

2. The method of coating a steel surface which comprises applying to the steel a mixture of aqueous sodium silicate and zinc powder, allowing to dry to a film thickness not in excess of five mils, and thereafter treating said film with the reaction product of propylene oxide and phosphoric acid in an amount sufficient to insolubilize the film.

References Cited by the Examiner

UNITED STATES PATENTS

| | | | |
|---|---|---|---|
| 2,372,244 | 3/45 | Adams et al. | 260—461 |
| 2,440,969 | 5/48 | Nightingall et al. | 117—160 XR |
| 2,462,763 | 2/49 | Nightingall et al. | 117—160 XR |
| 2,673,817 | 3/54 | Burns | 117—135.1 |
| 2,998,328 | 8/61 | Munger et al. | 117—135.1 XR |

WILLIAM D. MARTIN, *Primary Examiner.*